Oct. 4, 1966  D. W. PILGRIM ETAL  3,276,410
D.C. SERVO

Filed Jan. 23, 1964  8 Sheets-Sheet 1

INVENTORS
DARREL W. PILGRIM
EDWIN C. McCOY

BY Claude Funkhouser
ATTORNEY

Oct. 4, 1966 D. W. PILGRIM ETAL 3,276,410
D.C. SERVO
Filed Jan. 23, 1964 8 Sheets-Sheet 6

United States Patent Office 3,276,410
Patented Oct. 4, 1966

3,276,410
D.C. SERVO
Darrel W. Pilgrim, Satellite Beach, Fla., and Edwin C. McCoy, Paoli, Pa., assignors, by mesne assignments, to the United States of America as represented by the Secretary of the Navy
Filed Jan. 23, 1964, Ser. No. 339,822
4 Claims. (Cl. 114—23)

The present invention relates to servo control systems and more particularly to servo control systems for use in the guidance of torpedoes and the like.

In the past, designers of guidance systems have been faced with the choice of incorporating either A.C. or D.C. servo systems into their design and have been limited by the inherent disadvantages of whichever system was selected. Characteristically, A.C. systems have been complex, costly and ineffective in eliminating erroneous signals resulting from noise. D.C. systems, on the other hand, have been limited by their slow response and decreased sensitivity. The present invention incorporates the advantages of rapid response and sensitivity hereinbefore realizable in A.C. systems alone, in a D.C. system by utilizing micro position highly sensitive relays in the bridge circuits of the D.C. servo system.

To facilitate an understanding of the invention, an embodiment thereof is disclosed, suitable for use in a multimode homing torpedo.

Briefly, the torpedo may be launched from surface craft or aircraft and is designed to attack submarines. Therefore, following launch, the torpedo must realize a certain depth before commencing its search pattern so as not to home on the launching craft. Upon reaching this depth, the warhead is enabled and a helical search pattern is begun, the transducer of the torpedo emitting sonic signals while searching. Once echoes are received from a target, the torpedo will home thereon until contact is made. If the target is lost, the torpedo searches for a predetermined time in the general direction it had been moving, and if successful in relocating the target, the torpedo will once more resume the helical search pattern. While homing on a target, three modes of operation are possible, received signals causing differing response in each mode of operation, dependent upon the torpedo-to-target range.

Obviously, such intricate programming of the torpedo's movement requires rapidly responsive, highly sensitive, and reliable control circuitry. By using a novel arrangement of stepping relays and banks of precision fixed resistors in the sensing arms of bridge circuits of the control systems, the rigorous requirements necessary for guidance of the torpedo are realized.

An object of the invention is the provision of a control system for moving bodies with high sensitivity, simplicity and freedom from extraneous signals.

Another object of the invention is the provision of a control system for moving bodies with rapid response and freedom from error.

A still further object of the invention is the provision of a control system of higher accuracy than heretofore obtainable.

Other objects and many of the attendant advantages of this invention will be readily appreciated and will be more particularly pointed out in the appended claims.

Reference is now made to the following description taken in conjunction with the accompanying drawings wherein.

*General operation*

Figure 1:
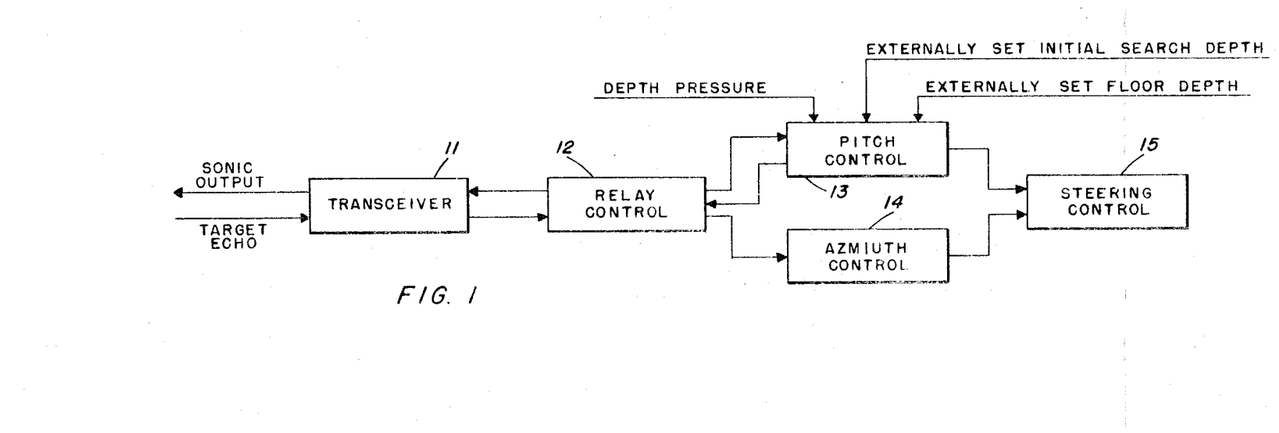
FIG. 1 shows a functional block diagram of the control system.

Referring to FIG. 1, a functional division of the control system is shown.

The transceiver 11, forming no part of the present invention, comprises a transmitter, receiver and transducer, which in response to timing signals from the relay control system 12 sends "pings" or acoustic pulse signals through the water. In the presence of a target, echo pulses are returned to the transceiver 11. The relay control system 12 receives these target signals and converts them to control signals for use in the elevation and azimuth control circuitry 13 and 14, respectively.

Before launching the torpedo, the pitch control system 13 receives information which determines the initial search depth and the range in which the torpedo is to run its search pattern. Information is also fed indicative of the depth of the ocean. After the initial search depth is reached and the torpedo is enabled, the pitch control 13 and azimuth control 14 receive search data from the relay system 12 which in turn operates the servo motors of steering control 15 by comparing the desired pitch with the actual pitch obtained from a pendulum located in the torpedo. After target acquisition, further signals are received which direct the mode of attack.

In the search phase the search signals from the relay control 12 cause the azimuth circuitry 14 to turn the torpedo to port. Upon acquisition of a target, the torpedo turns towards, and thereafter remains on, the target through action induced in the steering control 15 by the relay control unit 12.

Figures 2A, 3:
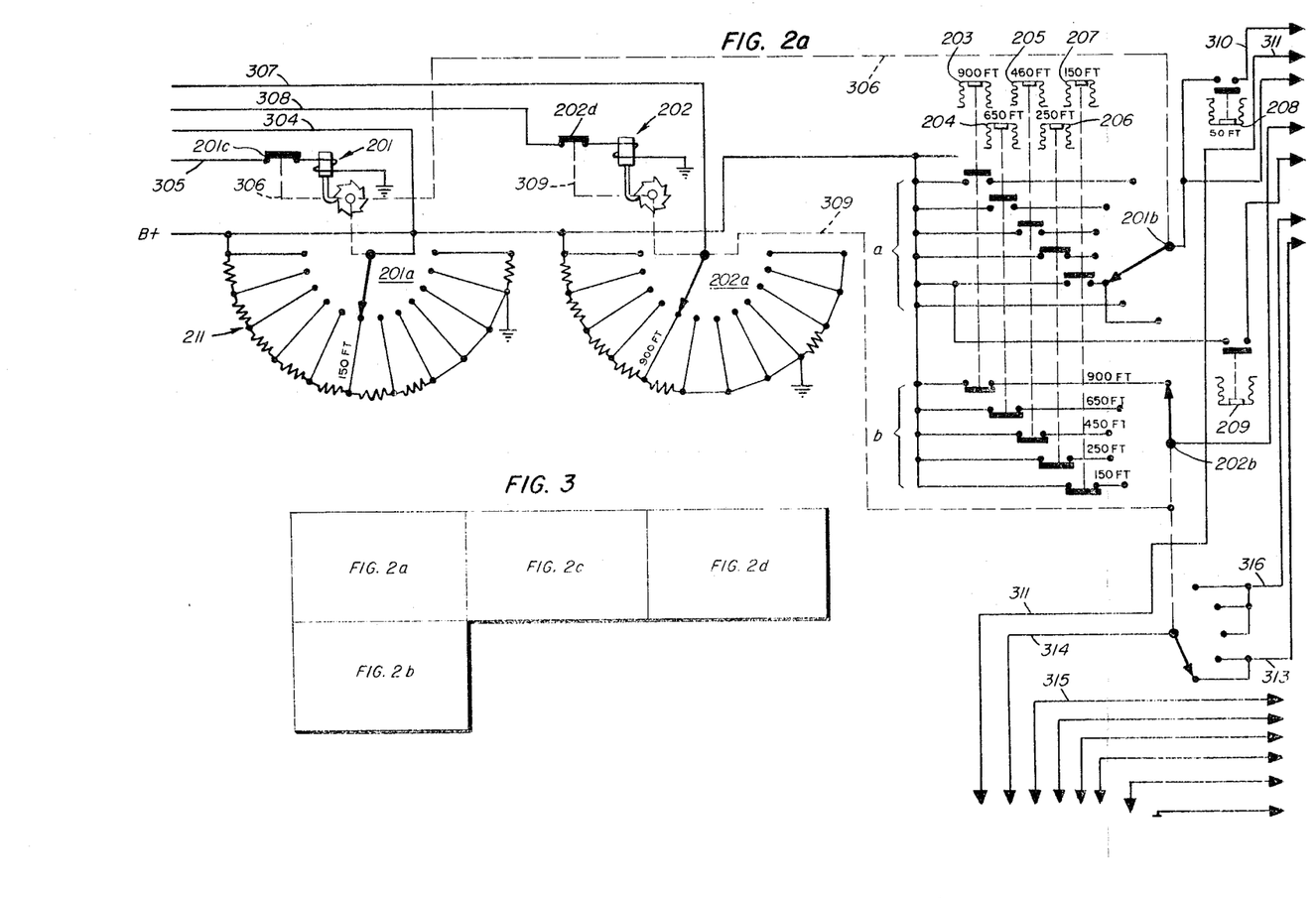
FIGS. 2a, 2b, 2c and 2d are a composite schematic diagram of the control circuitry of the system.
FIG. 3 shows the layout of FIG. 2.
Figure 2B:
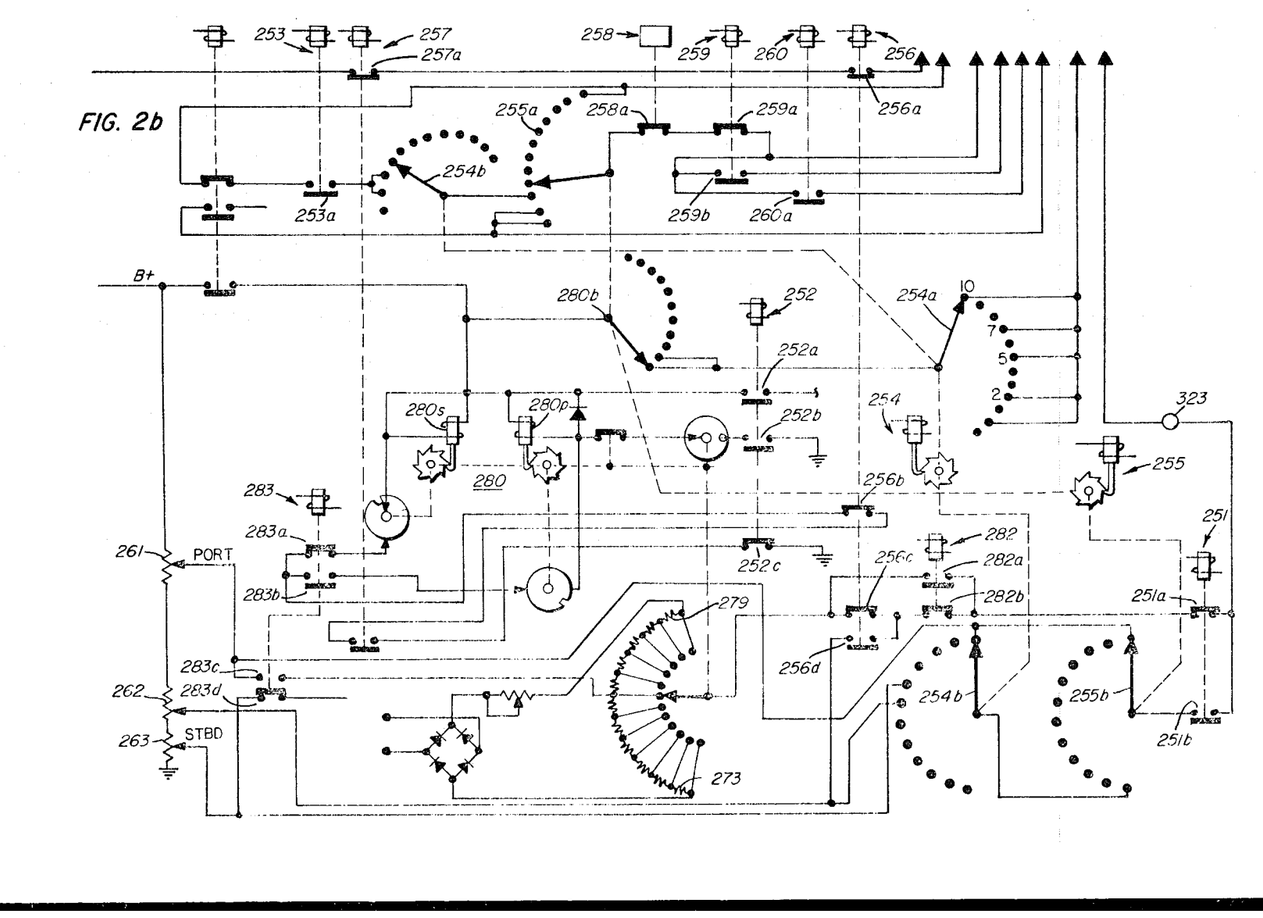
Figure 2C:
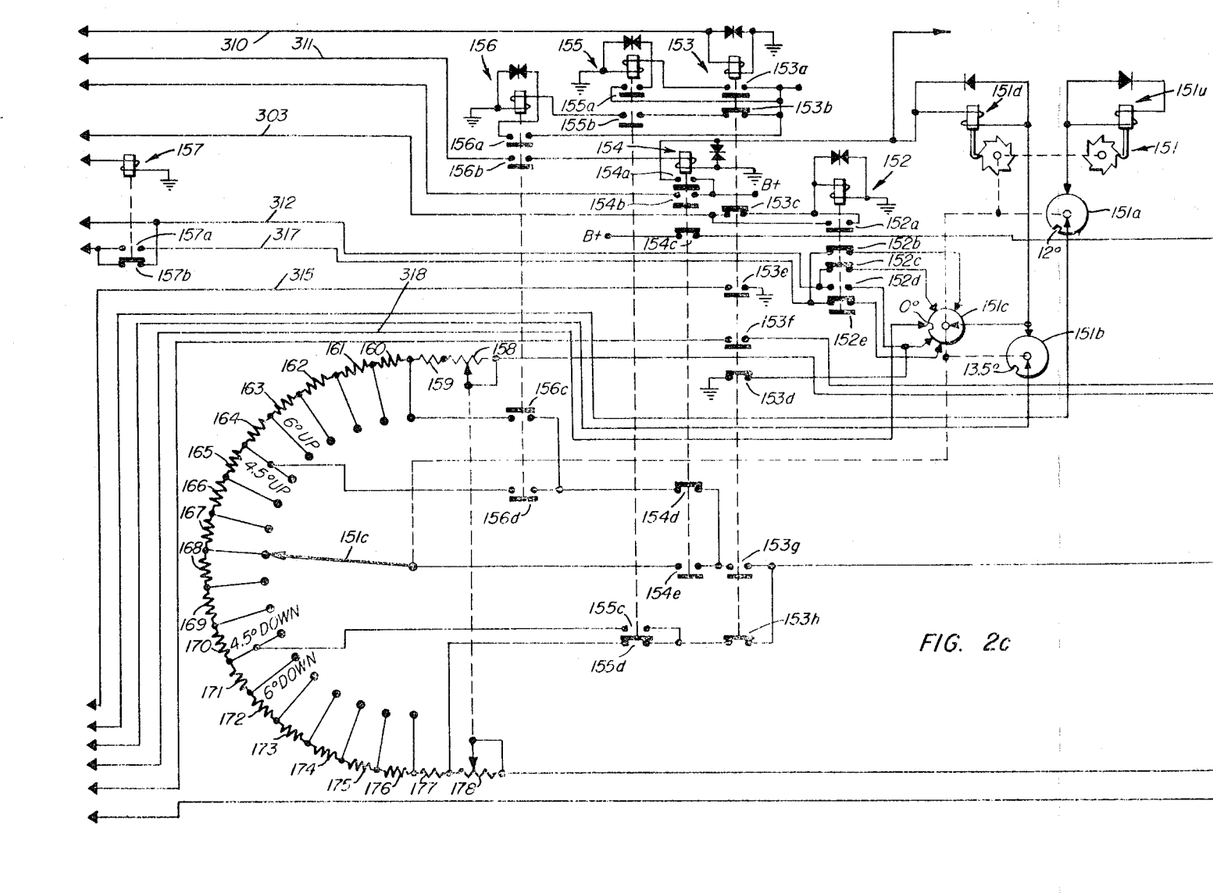
Figure 2D:
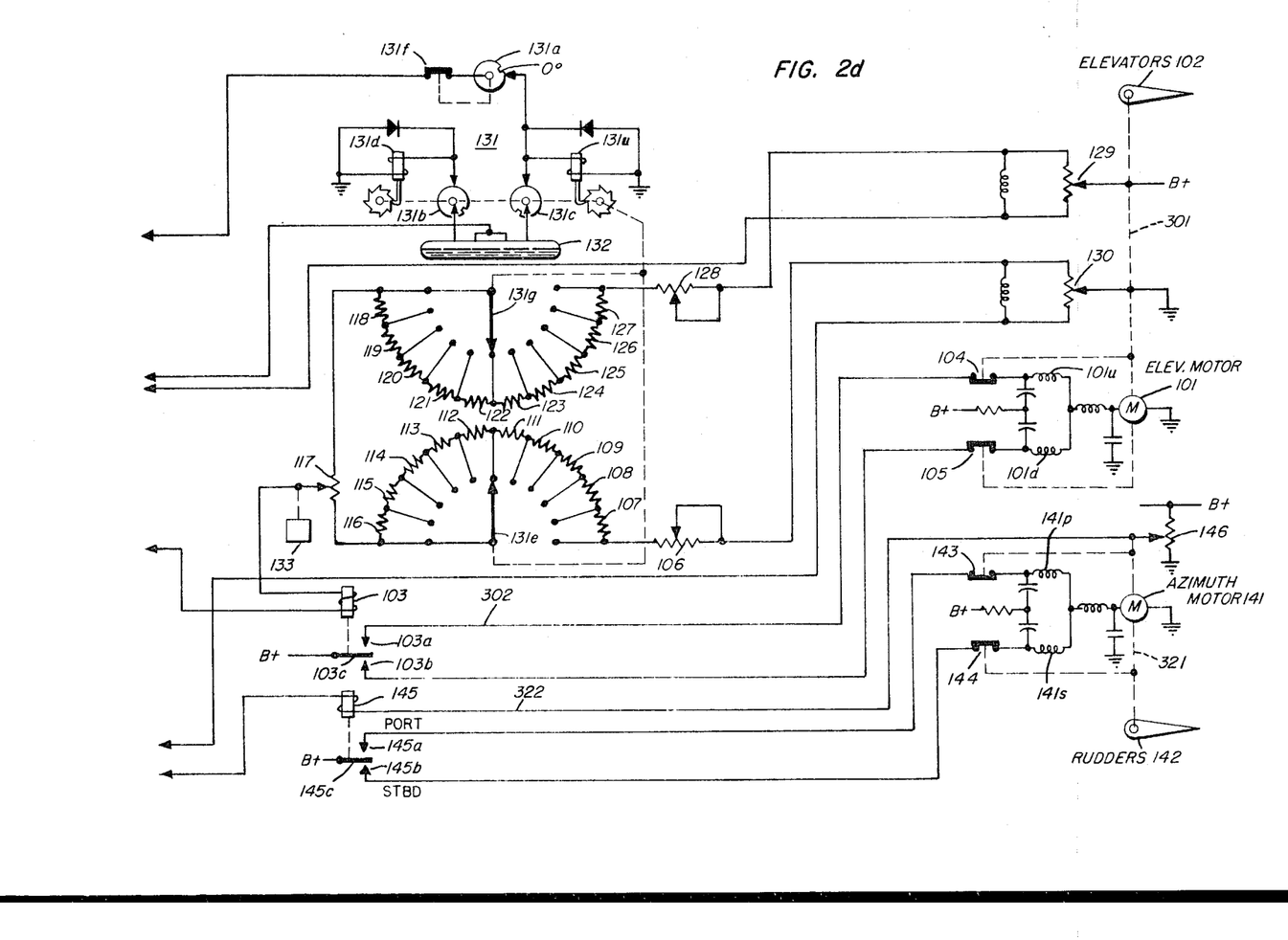

Turning now to FIG. 2, the layout of which is shown in FIG. 3, for a detailed description of the invention, in which, because of the complexity of the depicted elements appearing therein, FIG. 2a has been assigned reference numerals 201 to 249, FIG. 2b reference numerals 251 to 299, FIG. 2c reference numerals 151 to 199 and FIG. 2d reference numerals 101 to 149. Relay contact pairs, cams, stepping switches and the like are referenced with the reference numeral assigned to the relay proper with a lower case letter immediately following the numeral. For example, the stepping switch of relay 151 is referenced as 151d. Connections, either electrical or mechanical, between elements are referenced in the 300 series of numbers.

*Pitch control system*

The elevation motor 101 drives the elevators 102 up, when current flows through the "up" field coil 101u and down when current flows through the "down" field coil 101d, via mechanical linkage 301. The coils 101u or 101d are selected by action of the elevation relay 103, a highly sensitive polar relay. If current flows therethrough from left to right contact arm 103c contacts terminal 103a to cause current flow from B+ along conductor 302 to coil 101u thereby activating the motor 101 to move the elevator up, current flow in the other direction through the coil of relay 101 causes the arm 103c to close on contact 103b and current flows through coil 101d. Limit switches 104 and 105 which are also mechanically linked to the motor and elevators via linkage 301, limit the angle of the elevators by breaking contact when a predetermined elevator pitch is reached.

The voltage differences at the terminals of coil 103 are supplied by the series resistive networks comprising resistors 106 to 130 and 158 to 178. Assuming, for the moment, that all relays are static, pitch pendulum 133 drives the arm of potentiometer 117. The pendulum remains vertical at all times and the potentiometer casing is fixed to the torpedo so that as the torpedo changes pitch, the angle of the arm relative to the potentiometer changes and causes the resistance to change, hence, causing the voltage balance across the coil of relay 103 to change. As aforementioned, this activates relay 103 which effects a change in elevator angle and the pendulum and case move relative to one another decreasing the error voltage across the coil. The elevation order voltage may be selected by wiper arm 151e across any of the junctions between resistors 159 to 177 determined by the position of the wiper arm which is controlled by relay 151. Resistors 158 and 178 may be adjusted to set the specific voltage increments appearing across these junctions. Additional control is exerted by relays 152 to 157.

Because the electrolyte for the batteries in the power supply is sea water, when the launched torpedo first hits the water no power is available and hence all of the relays are deenergized. (All contacts in the positions shown in the figure.)

Floor depth relay 152 is first energized by current through contact pair 153c along conductor 303 through switch wafer 202b (to be discussed hereinafter) which may be assumed to be preset at 900 feet, and the "b" contact pair of pressure switch 203 to B+. While relay 152 is energized contact pair 153c is bypassed by contact pair 152a and hence the relay 152 remains in the energized state while pressure switch 203 is in the position shown. The pressure switches 203 to 207, 208 and 209 are operated, by the pressure of the sea water and are in the position shown until the depth indicated is reached. As long as the torpedo remains at or below the indicated depth, those contacts associated with the switches shown opened are closed and those shown closed are opened. Therefore, relay 152 remains energized until the floor depth of 900 feet is attained. With relays 153 and 155 deenergized, the order voltage is that voltage appearing across resistors 158 to 177 connected to the coil of relay 103 through normally closed contact pairs 155d and 153b.

The initial search depth hereinafter referred to as ISD, is preset into the system by the stepping of relay 201. Stepping switch 201c opens each time the relay is stepped and an externally applied voltage appearing across leads 304 and 305 causes the relay to step until the voltage across resistor bank 211 as connected by wiper arm 201a is equal and opposite to the applied voltage. (Assume 150 feet has been preset.) Switch 201b mechanically linked to relay 201 via linkage 306 is also positioned at the 150 foot terminal. The floor depth mentioned heretofore is set in the same manner by a voltage applied to the coil of relay 202 across leads 307 and 308. Mechanical linkage 309 serves to set switches 202b and 202c as shown. The ISD relay 201 (wafer switch 201b) through the appropriate one of switches 203 to 207, in this case 207, energizes relay 153 via conductor 310 when the appropriate depth is reached, ceiling switch 208 closes when 50 feet is reached. Contact pair 153g close and connect relay 103 to the 10.5° up order voltage through 154d and 156c. The torpedo then climbs at this pitch angle to compensate for the overswing below ISD because of the rapid 30° dive. Relay 153 also energized relay 155 through contact pair 153a, which relay locks due to the closing of pair 155a.

The torpedo now climbing through the ISD drops out relay 153 due to the opening of pressure switch contacts 207a and a 4.5° down order voltage is connected to relay 103 via contact pair 155c and 153h now closed. Simultaneously relay 156 closes, pair 155b having closed, and locks due to the closing of contacts 156a. When the torpedo again dives below ISD relay 153 again is energized and 4.5° up order is connected to relay 103 via contact pair 156d, 154d and 153g. Thereafter the torpedo alternately climbs and dives at 4.5° until the enable relay 154 is energized.

The pitch control relay 151 comprises two separate solenoids 151u and 151d which step the same set of switches, 151u initiating action to drive the elevators up and 151d initiating action to drive the elevators down.

The relays shown in FIG. 2 are controlled, energized and deenergized, by control circuitry forming no part of the present invention and hence the manner in which they are controlled is not disclosed herein. This control is discussed only to the extent necessary to show operation of that portion of the system which forms part of the invention claimed herein.

Just prior to initiation of the helical search pattern, a flat search is made. This flat search is a complete circle parallel to the horizontal which occurs after the ISD has been obtained and after enabling of the torpedo.

Figure 4:
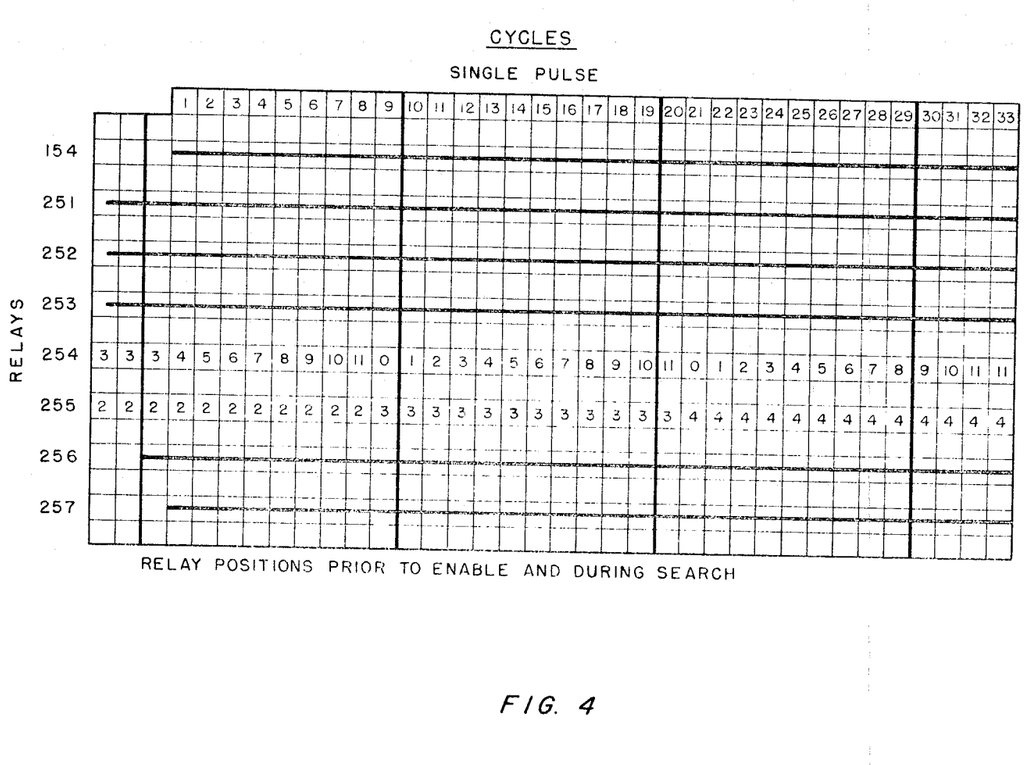
FIG. 4 depicts the control relay action prior to enable and during fleet search.

FIG. 4 shows the sequence of control of the relays in the control relays system from the time power is supplied to the torpedo, prior to enable and during the flat search interval. The solid line in a "pulse" cycle indicates energization of a relay, while the absence of such indicates that the relay is deenergized. The numbers in the "pulse" cycle blocks of stepping relays 254 and 255, indicate the switch positions during that particular cycle. Assume each single pulse cycle to be 1.25 seconds.

As soon as power is available relays 251, 252 and 253 are energized and relays 254 and 255 step to the "3" and "2" positions, respectively. After a predetermined interval, shown as two cycles, relay 256 is energized, and one cycle later relay 257 is energized. Assuming that the ISD has been reached, relay 154 energizes along with relay 257 via 257a, 256a, lead 311, and 156b, and the torpedo search pattern commences. At this time relay 254 steps one position per pulse cycle, relay 255 steps one position each time relay 254 reaches the "zero" position. This occurs for 32 cycles at which time relay 254 is in the "11" position and 255 is in the "4" position.

During the cycles when relay 255 is either in the "2" or "3" position, the down solenoid of relay 151 is grounded through 151d, the self stepping contact, contact 151c which remains closed for all positions but zero degrees position "2" or "3" of wafer 255a and contact pairs 258, 259a and 153c. The self stepping contact 151d of relay 151 opens each time the relay is energized causing deenergization and hence closing contact 151a which causes the relay to energize again and step. This action continues until the relay steps cam 151c to the zero degree (0°) position which opens the circuit. This stepping action is extremely rapid and the position is reached almost as soon as called for. When cam 151c is in the 0° position, the torpedo makes a port turn at constant depth, the flat search made referred to hereinabove.

To assure that the constant depth is maintained during this period, pitch adjust relay 131 is operated. Prior to enable, 131 is self stepped to the zero degree position on cam 131a, self-stepping contact 131f, voltage supplied through 154c in the same manner as mentioned hereinbefore for relay 151. After relay 154 has been energized, after enable, relay 131 is controlled by mercury switch 132 which switch is mounted along the centerline of the torpedo such that if the torpedo pitches up slightly one set of contacts are closed, if pitched down slightly, the other set of contacts are closed. When the contacts are closed a voltage is connected to the proper coil of relay 131 to step switches 131g and 131e, which steps resistance in or out of the series circuit of which the potentiometer 117 forms a portion thereof. This is accomplished only when contact pair 153f is closed, wafer 254a is in the "10," "7," "5," "2" or "0" position and wafer 255a in the "2" or "3" position. Thus, relay 255 serves to generate the D.C. pulses necessary to step pitch adjust relay 131. On the twenty-first pulse cycle, relay 255 steps wafer 225a to position "4" and opens the circuit from B+ to relay 131 and until another flat turn is called for. The resistor network remains set in the position called for at the twenty-first cycle.

When relay 255 steps wafer switch 255a to the "4" position, control of relay 155 switches from the flat turn to the helical search pattern, searching between the present ISD and the preset floor depth. As mentioned hereinbefore, assuming ISD relay 201 has preset wafer 201a to 150 feet and assuming the floor depth relay 202 has been set to 900 feet, relays 153 and 152 are both energized. Because the torpedo is now at the ISD of 150 feet, pressure switch 209 which does not close when the torpedo is above 215 feet, is opened and pitch control relay 151 steps to a grounded position of 4.5° down through contacts 151d, 151c, 152d, lead 312, 313, 157b, 202d, 314, position "4" of 255a, 258a, 259a, 315 and 153c. The relay 151 steps to the 4.5° down position and the torpedo dives at this pitch angle. When pressure switch 209 cuts in, relay 157 is energized causing contacts 157a to open and 157b to close. This steps relay 131 to the down 6° pitch position and the torpedo dives at this angle. When the present floor depth is reached, pressure switch 203 opens which denergizes relay 152, contact pair 152b opens causing relay 151 to step to the 6° up position and the torpedo rises at this angle. When 215 feet is attained switch 209 opens and the relay steps to the 4.5° up position. When the 50 foot ceiling switch 208 opens relay 153 is deenergized and contact pair 153h connects the 4.5° down order to the circuit and the drive cycle is again begun, since contact pair 153d grounds the relay and contact pair 153c energizes relay 152 again, and when the torpedo dives and switch 208 closes, relay 153 is again energized. The search pattern is identical for all ISD and floor depth settings except that relay 157 is bypassed when the floor is set at 150, 250 or 450 feet and the ground is established on lead 316 rather than 313.

Figure 5:
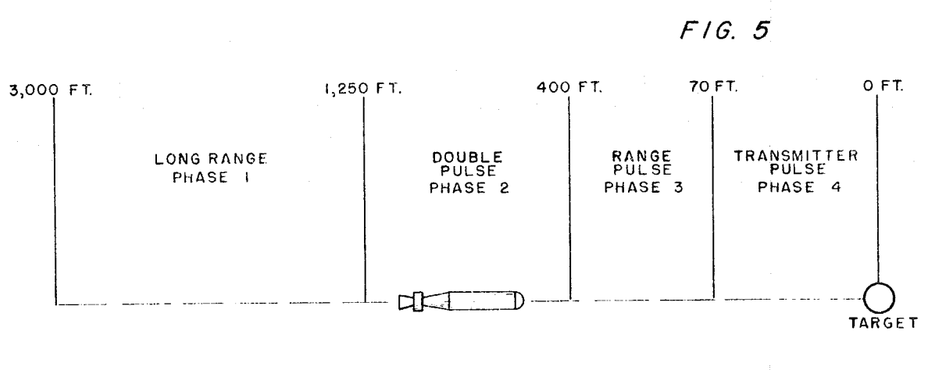
FIG. 5 shows the various phases of attack.

As mentioned hereinbefore, as a target is acquired and the torpedo-to-target range decreases, the mode of attack changes. FIG. 5 indicates the various attack modes and when the torpedo is 3000 to 1250 feet from the target, phase 1 (long range attack), a pulse is transmitted at the same time interval as during the search phase; from 1250 to 490 feet, phase 2 (double pulse attack), two pulses are sent out in each pulse cycle; from 490 to 70 feet, phase 3 (range blank), two pulses are also sent out in each pulse cycle; and from 70 feet to target contact (0 feet), phase 4, the receiver is blanked out and the torpedo continues in the same direction and at the same pitch as traveled prior to blank-out, for several seconds. In all phases, if the target is lost the torpedo continues its path for several seconds before resuming the helical search. Thus, in the transmitter blank phase 4, if contact is not made in a predetermined time interval, the torpedo will resume search.

Figure 6:
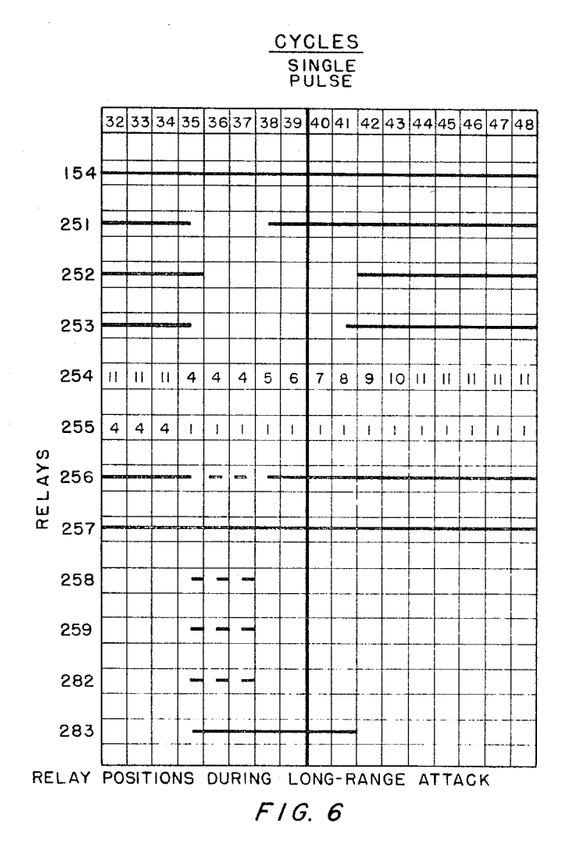
FIG. 6 depicts the control relay action during phase 1 of attack.

Returning now to FIG. 2 in conjunction with FIG. 6 to explain elevation relay action during phase 1 or long range attack; assuming the target is above and to the left of the torpedo and three pulses have been received before the target is lost, the up relay, relay 259, trips three times and then drops out. Relay 258 is energized before the end of the cycle opening contacts 258a which disconnects relay 151 from the ground long enough to allow relays 254 and 255 to step from positions "11" and "4" and "1," respectively. Relay 256 is deenergized upon receipt of an echo pulse and energizes again just prior to four pulse cycles after the echoes are no longer received (the end of pulse cycle 41).

With contact pair 259b closed, relay coil 151u steps relay 151 one step in the "up" position. Thus ground is established from 151u, 151a, 317, 259b, 315 and 153c. Each step causes a 1.5° up change in the elevators, limited to a total change of 12° up by cam 151a at which time the circuit is opened. In a similar manner tripping of relay 260 causes a down order change of 1.5° limited to 13.5° total by cam 151b. If the target is lost (pulse cycle 38) relay 254 steps one position per cycle until again reaching position "11" and the pitch control remains opened and therefore maintains constant pitch for 6 cycles at which time the relay reaches position "10" wafer 254b, 253a, 261a, lead 314, 202c, etc., again establishing the connection of relay 151 which connection causes the torpedo to resume the helical search.

Figure 7:
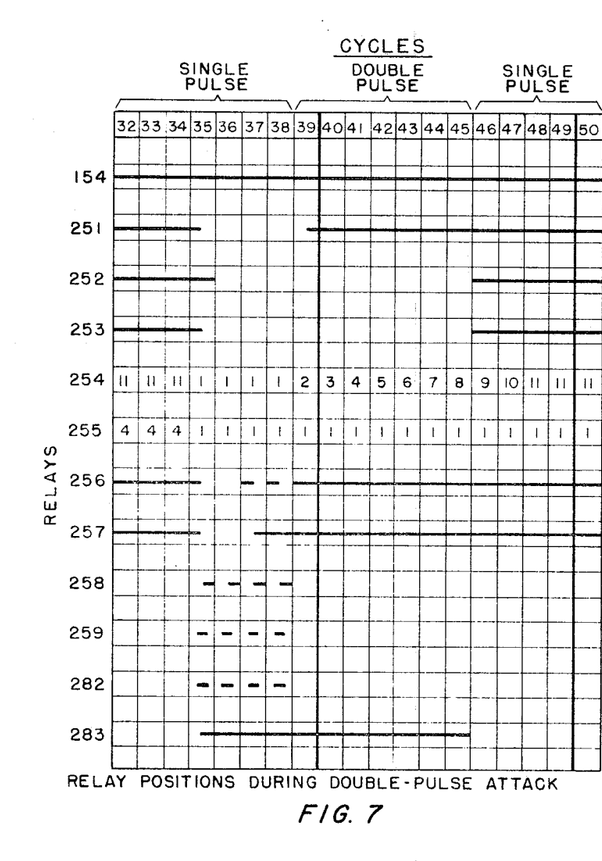
FIG. 7 shows the control relay action during phase 2.

If a target is detected during phase 2 (double pulse attack), FIG. 7., the action is the same as described for phase 1 with the exception that relay 254 steps to position 1 upon receipt of an echo and 7 double pulse cycles (0.625 second) and 2 single pulse cycles or 6.875 seconds are delayed between target loss and resumption of search.

Within 490 feet of the target, if a target is acquired, phase 3 (FIG. 8), all relays are the same as for phase 2 with the exception of relay 261 which trips when echoes are received. This causes contacts 261a to open and therefore the torpedo reacts as in the double pulse mode described above. If the target is lost, relay 254 steps once each cycle and relay 255 each time 254 reaches the "0" position. This continues until relays 254 and 255 are in the "11" and "4" positions, respectively.

During pulse cycles 38 to 45, the double pulse attack described above is initiated. Pulse cycles 46 and 47 relay 254 is in the "10" and "11" position, wafer 255a; pitch control relay 151 is stepped to the 0° position on cam 151c, the connection to ground completed through relay contacts 153c, 315, 259a, 258a, 254b, 253a, 261b and lead 318 to cam 151c. When relay 255 steps to the "2" position, wafer 255a, the circuits are as they were during the flat search described hereinbefore and this continues until relay 255 steps to the "4" position. Relay 253 is in the circuit to prevent stepping of relay 151 if the echoes are again received when relay 254 is stepping to the "10" or "11" position.

Figure 8:
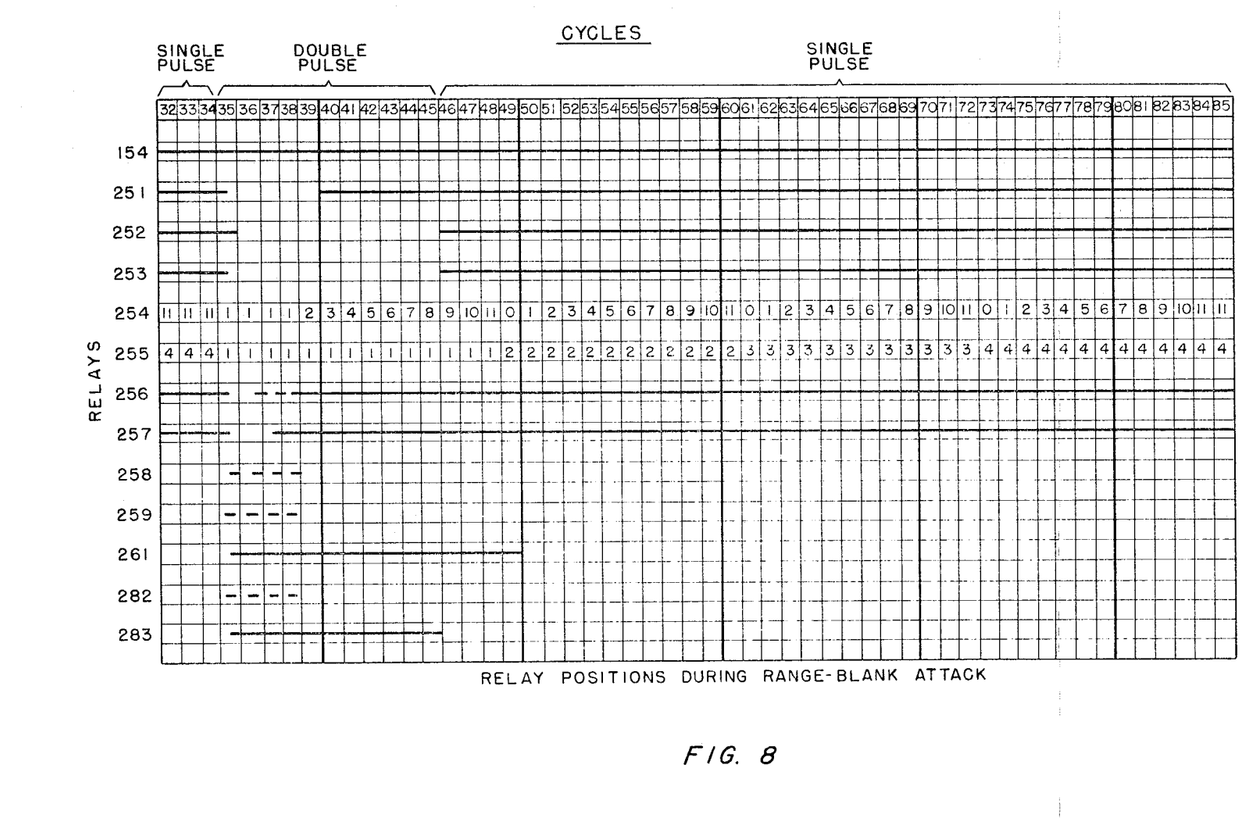
FIG. 8 depicts the control relay action during phase 3 of the attack.

As aforementioned, the phase 4 operation in which the transmitter is blank, is exactly the same as that action for a lost larget, cycles 38 et seq, on FIG. 8.

*Rudder control system*

The rudder control system is similar in many respects to the elevatioin control system. Azimuth motor 141 drives the rudders 142 due to action of the azimuth control relay 145 which is similar to relay 103 in the elevation control circuit, comprised of "port" contacts 145a in the port field coil circuit 141p, through limit switch 143 and "starboard" contact 145b connected to the starboard field coil 141s through limit switch 144. The response of the rudders 142 is monitored by the voltage across potentiometer 146 whose contact arm is mechanically linked to the motor rudder via link 321 and connected via lead 322 to one side of the coil of relay 145.

The order voltage to azimuth control relay 145 is that voltage seen across the potential divider comprising resistors 261 to 263, a voltage approximately one half of B+ calls for a straight rudder, a voltage greater than one half B+, port rudder and less than one half B+ starboard voltage. Generally, the port and starboard rudders are set at 11°. This may be modified by the resistor bank 273 to 279 controlled by relay 280 in much the same way that relay 151 affected control of the elevation order voltage. As long as no echoes are received by the receiver, relay 252 is energized and relay 280 self steps to the "0" degree position through contacts 252b, cam 280b and self-stepping switch 280a.

During search and prior to enable (action of relay 154) FIG. 4, relay 251 is energized causing a direct connection from resistor 261, lead 324, through position "3" on wafer 254b, "2" on wafer 255b contact pair 251b, lead 323 to the coil of relay 145, which causes the torpedo to turn at 13 degrees per second to port.

Long range echoes (FIG. 6) cause relay 251 to drop out until the end of cycle 39, the first cycle without an echo and relay 282 to trip along with relay 258 causing an 11° port or starboard order depending upon the condition of relay 283 which determines the order. If the relay is energized contact pair 283c completes the connection, deenergized contact pair 283d completes the connection. When relay 253 is deenergized, relay 256 drops out but only for one pulse cycle after the first echo received and remain deenergized for 0.43 second, for subsequent echoes. The first echo (1.25 seconds) causes the rudder to turn 11° towards target and subsequent echoes (0.43 second) affects the launching by 5° since 0.43 second is not sufficient time for the rudders to turn back to 0°. If the target is lost relay 254 steps from position "4" to "11." As seen on wafer 254b from "4" to "7" the torpedo travels straight ahead, connected to resistor 262 and "8" to "11" starboard search starts and thereafter helical search commences at the "11" position.

Since relay 254 steps wafer 254b to position "1" rather than "4" in the double pulse attack (FIG. 7) the straight run is for 7 double cycles compensating for the shortened time. When position "8" is reached single pulse operation commences.

During phase 3 (FIG. 8) relay 261 provides power for relay 280 through contact pair 261a. When relay 256 is deenergized relay 280 steps in the direction last stepped; if relay 252 contact pair 252b is energized, relay 283 selecting the direction of 280. If the target is lost all relays but 254 follow the pattern shown in FIG. 7. Relay 254 continues to step until position "11" is reached four times. This operation, of course, causes relay 255 to step each time "0" is passed, thereby providing a flat search which in no way affects the rudders.

Thus, a guidance system has been disclosed which uses the combination of highly accurate banks of precision resistors in conjunction with rapid and accurate micro position stepping switches, to obtain the accuracy of D.C. systems and the rapid response of A.C. systems.

Obviously many modifications and variations of the present invention are possible in the light of the above teachings. It is therefore to be understood that within the scope of the appended claims the invention may be practiced otherwise than as specifically described.

What is claimed is:

1. The guidance system of an acoustic homing self-propelled antisubmarine weapon having a transceiver for transmitting sonic signals, receiving the echoes of said signals, and transforming said echoes to electrical signals indicative of the position of said weapon relative to a target; also first control means for generating relay control signals in response to said electrical signals; and second control means for steering said weapon; the improvement comprising:

pitch control means having a first plurality of relays;
    a first plurality of microposition stepping switches;
    a plurality of banks of resistors associated with said first microposition stepping switches;
    first switching means for sensing the depth of said weapon;
    second and third switching means for sensing the pitch of said weapon, said first, second and third switching means and said first control means operatively interconnected for actuating said first plurality of stepping switches and said first plurality of relays in a particular sequence to produce a voltage which is fed to said second control means for controlling the pitch of said weapon in response to said electrical signal and said weapon pitch;
    azimuth control means having a second plurality of relays;
    a second plurality of microposition stepping switches;
    a second plurality of banks of precision resistors associated with said second microposition stepping switches; and
    means for actuating said second plurality of relays and second plurality of stepping switches in a particular sequence for producing a voltage which is fed to said second control means in response to signals from said first control means and the voltage from said pitch control means to control the azimuth of said weapon.

2. The system of claim 1 wherein said first switching means comprises a plurality of pressure switches.

3. The system of claim 2 wherein said second and said third switching means comprise a mercury switch and a pendulum, respectively.

4. The device of claim 1 wherein one of said plurality of stepping switches is preset to an initial search depth and another of said plurality of stepping switches is preset to a floor depth.

References Cited by the Examiner

UNITED STATES PATENTS 3,063,396   11/1962   Kittleman           114—23

BENJAMIN A. BORCHELT, *Primary Examiner.*

F. C. MATTERN, P. A. SHANLEY,
                                 *Assistant Examiners.*